Figure 1:
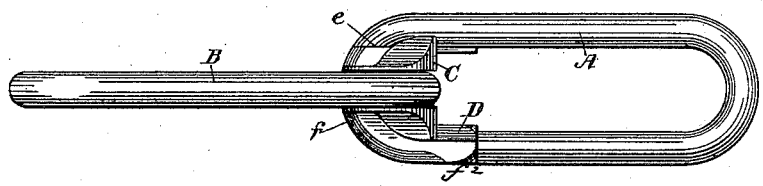

(No Model.)

W. D. EWART.
CHAIN CABLE.

No. 363,288. Patented May 17, 1887.

Witnesses:
W. J. Graham.
A. M. Williamson.

Inventor:
W. D. Ewart.
By J. N. McEntee
Attorney.

UNITED STATES PATENT OFFICE.

WILLIAM D. EWART, OF CHICAGO, ILLINOIS, ASSIGNOR TO THE EWART MANUFACTURING COMPANY, OF SAME PLACE.

CHAIN CABLE.

SPECIFICATION forming part of Letters Patent No. 363,288, dated May 17, 1887.

Application filed March 31, 1887. Serial No. 233,124. (No model.)

*To all whom it may concern:*

Be it known that I, WILLIAM D. EWART, of Chicago, in the county of Cook and State of Illinois, have invented a new and useful Improvement in Chain Cables; and I do hereby declare that the following is a full, clear, and exact description thereof, reference being had to the accompanying drawings, making part of this application.

My invention relates to that species of chain cable designed for use in connection with drive-wheels or chain-wheels, and in which some sort of bearing-blocks are used, arranged intermediately of the connected links and operating to form the working and bearing surfaces at the articulate joints of the chain. In this species of chain, as heretofore made, there have been smaller bearing-surfaces than are desirable for many uses where the parts of the chain come into contact with the working-faces of the teeth of the wheels, and it has been necessary to have the peripheries of the latter made grooved (or disk-shaped in cross-section) in order to have the chain properly supported by the wheels' periphery in the direction of the radii of the latter. As heretofore made, this species of chain has been adapted to run over wheels in either one of the two directions in which the chain-links are adapted to articulate or turn on each other; but my improved chain is intended to be run only in one of the two ways in which a cable chain is usually run, and my invention has for its main object to provide for use a chain of the species mentioned, adapted to work or to turn only in one direction, though flexible in the other direction also, and in which the intermediately-arranged bearing and wearing blocks shall afford not only bearing and wearing surfaces for contact with the working-faces of the teeth of the chain-wheel, that are substantially equal in width with the teeth, but shall also have bearer-surfaces adapted to properly support the chain laterally on a wheel having a plane or flat periphery; and to this main end and object my invention consists in a cable chain provided with intermediately-arranged duplex bearer-blocks or devices which work one on the other and constitute the bearing-surfaces of the articulate joints of the chain when the latter is bent in the one direction in which it is designed to run over the wheels, and which also operate to afford large bearing-surfaces to the teeth of the wheel and to properly support the chain laterally on a wheel having a periphery plane or flat in cross-section, all as will be hereinafter more fully explained, and as will be more particularly defined and pointed out in the claims of this specification.

To enable those skilled in the art to which my invention relates to make and use my improved chain, I will now proceed to more fully describe the latter, referring by letters to the accompanying drawings, which form part of this specification, and in which I have shown my invention carried out in that form in which I have so far practiced it.

Figure 2:
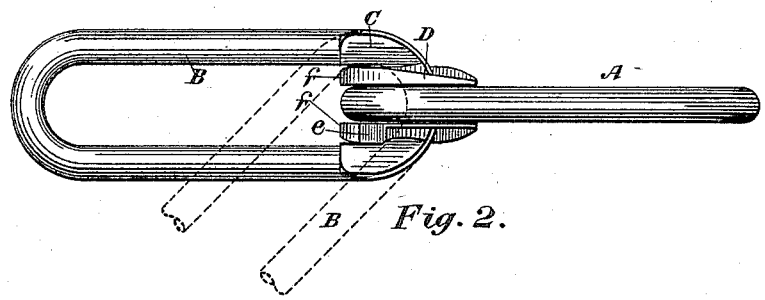
Figure 3:
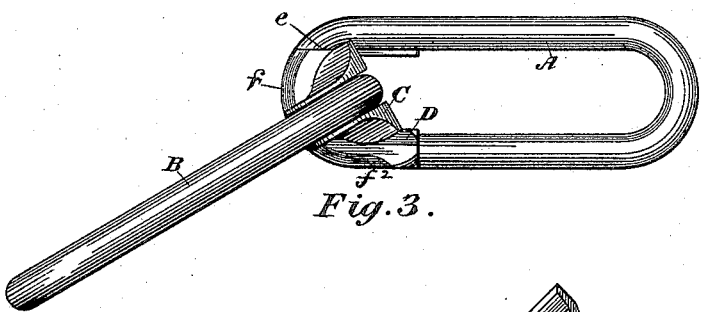
Figure 4:
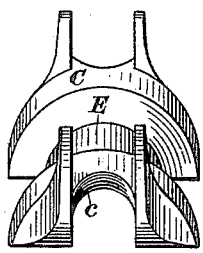
Figure 5:
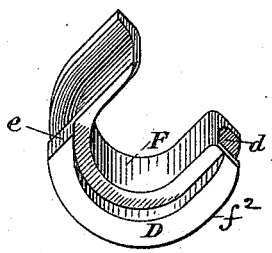

In the drawings, Figure 1 is a side view of one of the links of a chain made according to my invention. Fig. 2 is a top view of the same. Fig. 3 is a view similar to Fig. 1, showing the articulate movement of the links relatively. Fig. 4 is one of the parts of the duplex bearer-block contrivance that is interposed between the adjacent ends of each pair of links, detached from the rest of the chain; and Fig. 5 is a perspective view of the other one of said pieces.

At Figs. 4 and 5 I have shown the detached parts on a somewhat enlarged scale, and at Fig. 2 I have represented in dotted lines the movement of the coupled links, which will be referred to hereinafter.

In the several figures the same part will be found designated by the same letter of reference.

A and B are two similarly-constructed links, between the adjacent or coupled ends of which are interposed the two parts or pieces C and D of the intermediately-arranged bearing and wearing blocks. One of these blocks or pieces (marked D) is of larger conformation, and is so arranged with the end of the link A that, although it is removable from said link when the links of the chain are backed up and out of a working position, it moves always with the chain-link during the movement of the latter while the chain is in a working condition, while the other block or piece C is so shaped and combined with one end of the other link, B, and with the other block or piece, D, that, as shown at Fig. 3, whenever the links A and B may be turned relatively, as indicated at said figure, the block or device C will move with the link B, but turn in or against the block D of the other link, the curved or saddle-like bearing-surface E of said piece C turning within the correspondingly-shaped bearing-surface or housing F of the block D. At the same time the link B is capable of an articulate movement at its end relatively to its block C by turning within the grooved seat c of said block C, within which the semicircular end of the link B is fitted. This relative movement of the link B and its block C is indicated by the dotted lines at Fig. 2. The link A is somewhat similarly seated at its semicircular end within the grooved periphery d of its block or piece D; but said block or piece D, having leg-like portions extending, as shown, beyond the diameter of its semicircular curve, is incapable of any movement relatively to the link so long as the parts of the chain are maintained in a working or taut condition. Therefore, when the parts are all together and the chain in operation, as shown at Figs. 1, 2, and 3, the relative movements of the links, as the chain passes over or around the usual chain-wheels, occur in the direction indicated at Fig. 3, and in such manner that, while the bearer-blocks D never move relatively to the links A, nor the blocks C relatively to the links B, the said bearer-blocks or devices C and D turn or move relatively to each other, as indicated at Fig. 3, so that all the wear and tear comes on these blocks and upon no portions of the links proper of the chain. At the same time, as before explained, the links B are capable of movement relatively to the blocks C, in the manner indicated by dotted lines at Fig. 2, so that the flexibility, so to speak, of the chain in the direction opposite to that in which it is designed to be run over the wheels, is not destroyed by the use of the duplex bearer-block contrivance shown and so far described.

Each of the block portions or devices D, being made with a leg-like extension, which renders them too long for extrication from the link in the same manner as the blocks or devices C, may be removed from the links B, and are made with cut-aways or are slabbed off at one of the leg-like portions and at one side, as plainly shown at e in the drawings, whereby, in detaching the parts of the chain, these devices D may be extricated from the links A by first moving them toward the middle of the link and then turning them laterally relatively to the link until the slabbed-off or cut-away portion e passes away from the side bar of the link.

Each of the parts or devices D, (that are, as before explained, designed to be immovable relatively to the links A during the working of the chain,) is made, as shown, with its semicircular or curved exterior surface $f$ (see Fig. 2) of such size and extent that in the use of the chain on the ordinary toothed wheels the working-faces of the teeth of said wheels will come into contact with these surfaces $f$, which surfaces will constitute the entire bearing and wearing surface against the teeth of the wheel; and said devices D are also made, as shown, with the continuation of these surfaces at $f^2$ about coincident with the outermost line or portion of the link A, so that in running the chain over a toothed wheel having a plane or flat periphery these somewhat extended and flat surfaces $f^2$ of the devices D will come to a bearing on the flat or plane periphery of the wheel intermediately of the teeth thereof and (by reason of the devices D being immovable relatively to the links A) will, during the working of the chain, serve as sufficiently broad or extended supporting and bearing surfaces for the chain against the periphery of the wheel in the direction of the radii of the latter.

It will be seen that by combining with the links the devices C and D, constructed and operating together and with the links, in the manner described, I produce a cable drive-chain, in which not only are the links relieved of all frictional or wearing contact with each other, but in which also one of the parts of the duplex bearer-block contrivance affords an extended or ample frictional wearing-surface to coact with the working-faces of the wheels' teeth, and also sufficiently broad and durable bearing-surfaces to co-operate with the flat periphery of the wheel intermediately of the teeth and properly support those links of the chain which travel in a plane transverse to the axis of the chain-wheel.

Of course many modifications or changes in the precise details of structure shown may be made without departing from the principle of my invention—as, for instance, in lieu of having the saddle-like seat or curved bearing-receptacle E of the piece C made polygonal in cross-section, as shown, said saddle-like seat may be made curved in cross-section and the housing or bearing portion F of the piece D made to correspond in contour in cross-section.

Having now so fully described my invention that those skilled in the art can make and use a cable chain designed principally to travel in one direction over ordinary sprocket-wheels having their faces plane or flat in cross-section, what I claim as new, and desire to secure by Letters Patent, is—

1. In combination with the links A and B of an ordinary cable chain of the type shown, a duplex friction or bearer block contrivance, composed of a part, D, which is immovable relatively to the link with which it is combined during the working of the chain, and a part or device, C, adapted to turn within or move against the device D and with the link with which it is combined, but at the same time not destroying the flexibility of the chain in the direction opposite to that in which it is designed to be run over the wheels.

2. In combination with the links A and B, a bearer block or device, C, adapted to turn with one of the links, and a bearer block or device, D, adapted to move with the other link, and formed or provided with bearing-surfaces at $f$, which work against the teeth of the chain-wheel and relieve the chain of all frictional contact with the working-faces of said teeth.

3. In combination with the links A and B and an interposed bearing-block, C, a bearer block or device, D, which is immovable relatively to the link with which it is combined during the working of the chain and is formed or provided with bearing-surfaces at $f^2$, which rest and bear upon the plane or flat peripheral surface of the chain-wheel intermediately of the teeth of the latter, substantially as and for the purpose hereinbefore set forth.

In witness whereof I have hereunto set my hand this 26th day of March, 1887.

WILLIAM D. EWART.

In presence of—
  J. A. HURDLE,
  A. M. WILLIAMSON.